(12) United States Patent
Fu et al.

(10) Patent No.: US 11,655,373 B2
(45) Date of Patent: May 23, 2023

(54) METHOD OF PREPARING ELECTRIC AND TEMPERATURE DUAL-CONTROL BI-STABLE COLOR-CHANGING DYES AND MICROCAPSULES

(71) Applicant: Jiangnan University, Wuxi (CN)

(72) Inventors: Shaohai Fu, Wuxi (CN); Liping Zhang, Wuxi (CN); Chengcheng Wang, Wuxi (CN); Mingfei Sheng, Wuxi (CN); Anli Tian, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 134 days.

(21) Appl. No.: 17/395,793

(22) Filed: Aug. 6, 2021

(65) Prior Publication Data
US 2021/0363355 A1 Nov. 25, 2021

Related U.S. Application Data

(63) Continuation of application No. PCT/CN2020/099093, filed on Jun. 30, 2020.

(30) Foreign Application Priority Data

Jul. 18, 2019 (CN) .......................... 201910648872.1

(51) Int. Cl.
C09B 9/00 (2006.01)
C09B 67/02 (2006.01)

(52) U.S. Cl.
CPC ............ C09B 67/0097 (2013.01); C09B 9/00 (2013.01)

(58) Field of Classification Search
CPC .... C09B 9/00; C09B 67/0083; C09B 67/0097
See application file for complete search history.

(56) References Cited

FOREIGN PATENT DOCUMENTS

| CN | 1861607 A | 11/2006 |
|---|---|---|
| CN | 101755029 B | 4/2014 |
| CN | 104910714 A | 9/2015 |
| CN | 105950077 A | 9/2016 |
| CN | 109575911 A | 4/2019 |
| CN | 108468096 B | 7/2020 |
| CN | 110330809 B | 7/2020 |
| CN | 107216718 B | 9/2020 |
| CN | 108873537 B | 6/2021 |
| JP | S6054889 B2 | 12/1985 |
| JP | S6268880 A | 3/1987 |
| JP | H0772441 B2 | 8/1995 |
| WO | 2014002292 A1 | 1/2014 |

Primary Examiner — Bijan Ahvazi
(74) Attorney, Agent, or Firm — IPro, PLLC

(57) ABSTRACT

The disclosure discloses a method of preparing electric and temperature dual-control bi-stable color-changing dyes and microcapsules, belonging to the technical fields of fine chemicals and materials science. According to the disclosure, after an electrolyte, a leuco dye and an organic solid material are mixed according to 1:(2-10):(15-50), a series of electric and temperature dual-control bi-stable color-changing dye compounds having a color change temperature range of −5° C. to +80° C. can be prepared. The dye compounds change color under cooperative control of electricity and temperature, and can be continuously stable at a certain color change state according to different conditions, and finally achieve controllable color change conditions and controllable color change stable states. When being driven by voltage and temperature, the dual-control bi-stable color-changing microcapsules prepared according to the disclosure achieve controllable color change performance and color change stable states, and have the driving voltage being lower than 10 V (much lower than the human body safety voltage 36 V).

5 Claims, No Drawings

METHOD OF PREPARING ELECTRIC AND TEMPERATURE DUAL-CONTROL BI-STABLE COLOR-CHANGING DYES AND MICROCAPSULES

TECHNICAL FIELD

The disclosure relates to a method of preparing electric and temperature dual-control bi-stable color-changing dyes and microcapsules, belonging to the technical fields of fine chemicals and materials science.

BACKGROUND

"Leuco" refers to white. Color-changing leuco dyes refer to a category of dyes that become colored through interaction with a color developer; or colorless form dyes obtained by, for example, a non-reducing intramolecular cyclization reaction (a reaction restricted by heating, light, changes and the like). Generally, the color-changing leuco dyes include schiff bases, spiro compounds, double anthracene ketone, phenothiazines, phthalides, triarylmethanes, fluorans and the like.

Thermochromic dyes are generally mixtures of color-changing leuco dyes, color developers and solid solvents. The leuco dyes are chromophoric groups, the color developers determine the color depth, and the solvents determine the color change temperature. For example, in CN109667196A, 4,4'-dihydroxydiphenyl sulfone, colorless thermosensitive dyes, 1,2-diphenoxy ethane and auxiliary materials are used, bisphenol A is replaced with bisphenol S, the 1,2-diphenoxyethane is used as a sensitizer, and a small amount of stearate is added to lower the color development temperature of thermosensitive paper, and at the same time, the problem of low thermosensitivity of bisphenol S is solved. In CN104228385A, several polyisocyanates and prepolymers thereof are used in the thermosensitive color-developing layer to microencapsulate recessive thermosensitive dyes to form microcapsules, and softening temperature of different microcapsules is utilized to widen the color development temperature range of the thermosensitive layer, such that the minimum color development temperature range is 100° C.-150° C.

Some leuco dyes used for thermochromism can also change color under the action of an electric field. The color change principle is that: the gain and loss of electrons in the leuco dye is controlled by the on and off of the voltage, so that the structure of the dye changes (the lactone ring is opened and closed), which shows a color change. However, whether this category of leuco dyes are stimulated by electricity or temperature, when the stimulus value of this monocontrol color change element changes to the original data, the color immediately changes to the original color, and cannot stabilize in the color state after stimulation. On specific occasions, it is necessary to apply voltage and temperature all the time to maintain a certain required color, which affects the portability of color-changing materials, and this category of leuco dyes are not energy-saving, not environmentally-friendly and the like.

SUMMARY

In order to solve the above problem, according to the disclosure, the suitable electrolyte, leuco dye and organic solid material are searched and selected, and mixed according to a certain ratio to prepare a series of electric and temperature dual-control bi-stable color-changing microcapsules having the color change temperature of −5° C. to +80° C. and the driving voltage of 1-10 V. The color-changing microcapsules change color under cooperative control of electricity and temperature and can be continuously stable at a certain color change state under conditions of low temperature and power cut.

A first objective of the disclosure is to provide an electric and temperature dual-control bi-stable color-changing dye. The electric and temperature dual-control bi-stable color-changing dye includes a leuco dye, an electrolyte and an organic solid material.

In an embodiment of the disclosure, the leuco dye includes 1,3-dimethyl-6-diethylaminofluoran, 2'-chloro-6'-(diethylamino)-3'-methylfluoran, 2'-chloro-6'-(diethylamino) fluoran, 6'-(diethylamino)-1',3'-dimethylfluoran, triarylmethanes and screw pyran class.

In an embodiment of the disclosure, the selected electrolyte is tetrabutylammonium perchlorate (TBAP), tetraethylammonium perchlorate, ferric nitrate, barium sulfate, calcium carbonate, mercuric chloride, lead acetate or the like.

In an embodiment of the disclosure, the selected organic solid material is one or more of small molecular organic alkyl alcohols and alkyl acids, and macromolecular ethers and esters, and the organic solid material includes, but is not limited to, the following materials: stearyl alcohol, cetyl alcohol, myristyl alcohol, myristic acid, palmitic acid, stearic acid, glyceryl monostearate, glycerin monostearate, phenyl salicylate, glyceryl laurate, p-azoxyanisole, diphenyl carbonate, phenyl salicylate, phenyl stearate and benzyl benzoate.

In an embodiment of the disclosure, preferably, the organic solid material is one or more of macromolecular ethers and esters, including glyceryl monostearate, glycerin monostearate, phenyl salicylate, glyceryl laurate, p-azoxyanisole, diphenyl carbonate, phenyl salicylate, phenyl stearate and benzyl benzoate.

In an embodiment of the disclosure, a ratio of the leuco dye to the electrolyte to the organic solid material is 1:(2-10):(15-50).

A second objective of the disclosure is to provide an electric and temperature dual-control bi-stable color-changing microcapsule. The electric and temperature dual-control bi-stable color-changing microcapsule is prepared by using the above electric and temperature dual-control color-changing dye as a core material.

A third objective of the disclosure is to provide a method of preparing electric and temperature dual-control bi-stable color-changing microcapsules, including the following steps:

(1) dual-control compound: heating and magnetically stirring the above electric and temperature dual-control bi-stable color-changing dyes to form a uniform mixed solution, that is the dual-control compound; and (2) preparation of dual-control bi-stable microcapsules: dropwise adding the dual-control compound obtained in step (1) to an aqueous solution containing an emulsifier, the emulsifier accounting for 25-100% by mass of the dual-control compound, and carrying out high-speed emulsification to form a uniform dye dispersion; dropwise adding monomers accounting for 20-100% by mass of the dye compound to the dye dispersion, and continuing emulsification for 10-20 minutes; and then, transferring the emulsified dispersion into a four-neck flask with a reflux condenser and a stirring device, after introducing nitrogen for 5-30 minutes, raising the temperature to 55-75° C. at a stirring speed of 250-500 r/min, after reaching the reaction temperature, dropwise adding an initiator accounting for 0.1-1% of the total amount of the monomers, keeping the temperature to react for 2-6 hours, and after the completion of the reaction, washing the product with water and drying the product to obtain the dual-control bi-stable microcapsules.

In an embodiment of the disclosure, the selected monomers are one or two of methyl methacrylate, styrene, ethyl methacrylate, butyl methacrylate, vinyl acetate, methyl vinyl ether, acrylonitrile, acrylamide, isoprene and dicyclopentadiene.

In an embodiment of the disclosure, the selected initiator is one of potassium persulfate, ammonium persulfate and azobisisobutylamidine hydrochloride.

In an embodiment of the disclosure, the selected emulsifier is one or more of nonionic surfactants, anionic surfactants and polymeric surfactants, including, but not limited to, the following materials: gum arabic, sodium dodecylbenzenesulfonate, styrene-maleic anhydride copolymer, Tween and Span.

A fourth objective of the disclosure provides application of the above electric and temperature dual-control bi-stable color-changing microcapsules in color-changing materials.

The disclosure has the following advantages:

The disclosure provides the method of preparing the electric and temperature dual-control bi-stable color-changing microcapsules. The electric and temperature dual-control color-changing microcapsules prepared by the method change color under coordinated actions of specific voltage and temperature, have a color change temperature range of −5° C. to +80° C., and can be continuously stable at a certain color change state, thereby finally achieving controllable color change conditions and controllable color change stable states. The driving voltage is lower than 10 V (much lower than the human body safety voltage 36 V). After the microcapsules change color and then the power is cut off, the stable time can reach 5 days. The microcapsules have wide application prospects in the fields of color-changing textiles, color-changing glass and the like.

DETAILED DESCRIPTION

Preferred examples of the disclosure will be described below. It should be understood that the examples are intended to better explain the disclosure and are not intended to limit the disclosure.

A rigid substrate with an electrode is coated with color-changing microcapsules. After the coating is completely dried, the film is covered with another rigid electrode, the upper and lower electrodes are bonded by a colloid, and a display device is obtained by packaging. The device is respectively driven by a DC stable-state power supply, and the driving voltage of the color-changing microcapsules is verified according to the color change phenomenon.

Example 1

0.1 g of 2'-chloro-6'-(diethylamino) fluoran, 0.8 g of tetrabutylammonium perchlorate (TBAP) and 5 g of diphenyl carbonate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 31° C., the sample was colorless; when the temperature was higher than 31° C., the sample became orange-red from colorless; when the temperature was lowered to 31° C. or below and the voltage was removed, the sample still remained orange-red and had an energy-saving effect; and when the temperature was raised, the sample became colorless again. When no voltage was applied, the sample was colorless under any conditions.

Example 2

0.1 g of 2'-chloro-6'-(diethylamino) fluoran, 0.8 g of tetrabutylammonium perchlorate (TBAP) and 5 g of phenyl salicylate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 25° C., the sample was colorless; when the temperature was higher than 25° C., the sample became orange-red from colorless; when the temperature was lowered to 25° C. or below and then the voltage was removed, the sample still remained orange-red; and when the temperature was raised, the sample became colorless again. When no voltage was applied, the sample was colorless under any conditions.

Example 3

0.1 g of 2'-chloro-6'-(diethylamino) fluoran, 0.8 g of tetrabutylammonium perchlorate (TBAP) and 5 g of phenyl stearate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 31° C., the sample was colorless; when the temperature was higher than 31° C., the sample became orange-red from colorless; when the temperature was lowered to 31° C. or below and then the voltage was removed, the sample still remained orange-red; and when the temperature was raised, the sample became colorless again. When no voltage was applied, the sample was colorless under any conditions.

Example 4

0.1 g of 2'-chloro-6'-(diethylamino) fluoran, 0.8 g of tetrabutylammonium perchlorate (TBAP) and 5 g of benzyl benzoate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 5° C., the sample was colorless; when the temperature was higher than 5° C., the sample became orange-red from colorless; when the temperature was lowered to 5° C. or below and then the voltage was removed, the sample still remained orange-red; and when the temperature was raised, the sample became colorless again. When no voltage was applied, the sample was colorless under any conditions.

Example 5

0.1 g of 2'-chloro-6'-(diethylamino) fluoran, 0.8 g of tetrabutylammonium perchlorate (TBAP) and 5 g of glycerin monostearate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 80° C., the sample was colorless; when the temperature was higher than 80° C., the sample became orange-red from colorless; when the temperature was lowered to 80° C. or below and then the voltage was removed, the sample still remained orange-red; and when the temperature was raised, the sample became colorless again. When no voltage was applied, the sample was colorless under any conditions.

Example 6

0.1 g of 2'-chloro-6'-(diethylamino) fluoran, 0.8 g of tetrabutylammonium perchlorate (TBAP), 2.7 g of cetyl alcohol and 2.3 g of glycerin monostearate were magnetically stirred at 80° C. for 1 hour to obtain a uniform mixed solution. 1.8 g of sodium dodecylbenzenesulfonate and 95.2 g of water were emulsified under conditions of 70° C. and 6000 r/min for 20 minutes while an oil phase (2 g of uniform compound and 1 g of polymethyl methacrylate) was added dropwise. Then 0.01 g of ammonium persulfate was added, mechanical stirring (500 r/min) was carried out at 80° C. for 3 hours, and finally, the mixture was washed with water and dried to obtain a microcapsule product. 0.2 g of the product was weighed and pressed into a tablet to be used as a research object. When a voltage was applied and the temperature was lower than 60° C., the sample was colorless; when the temperature was higher than 60° C., the sample became orange-red from colorless; when the temperature was lowered to 60° C. or below and then the voltage was removed, the sample still remained orange-red; and when the temperature was raised, the sample became colorless again. When no voltage was applied, the sample was colorless under any conditions. Compared with Example 5, the cetyl alcohol and the glycerin monostearate were compounded, and the color change temperature was lowered from 80° C. to 60° C.; and when the glycerin monostearate was used alone, the color change temperature was 80° C., indicating that the compounding of the cetyl alcohol and the glycerin monostearate could significantly lower the color change temperature by 20° C.

Comparative Example 1

The 0.8 g of tetrabutylammonium perchlorate (TBAP) in Example 1 was omitted, other conditions or parameters were the same as those in Example 1, and a microcapsule product was obtained. 0.2 g of the product was weighed and pressed into a tablet to be used as a research object. The sample was colorless under any conditions, and thus, could not achieve electric and temperature dual-control color change.

Comparative Example 2

The diphenyl carbonate in Example 1 was replaced with cetyl alcohol, other conditions or parameters were the same as those in Example 1, and a microcapsule product was obtained. 0.2 g of the product was weighed and pressed into a tablet to be used as a research object. When a voltage was applied and the temperature was lower than 28° C., the sample was colorless; when the temperature was higher than 28° C., the sample became orange-red from colorless; when the temperature was lowered to 28° C. or below and the voltage was removed, the sample still remained orange-red, and had an energy-saving effect; and when the temperature was raised, the sample became colorless again. When no voltage was applied, the sample was colorless under any conditions. However, the color change of the sample was uneven, the color was lighter, and the driving voltage was larger.

Comparative Example 3

The 0.1 g of 2'-chloro-6'-(diethylamino) fluoran in Example 1 was replaced with 0.1 g of N-[4-[2-(4-methoxyphenyl) diazenyl]phenyl]-2-nitroaniline, other conditions or parameters were the same as those in Example 1, and a microcapsule product was obtained. 0.2 g of the product was weighed and pressed into a tablet to be used as a research object. The sample was colorless under any conditions, and thus, could not achieve electric and temperature dual-control color change. The inventors found after many experiments that fluoran dyes, such as 1,3-dimethyl-6-diethylaminofluoran, 2'-chloro-6'-(diethylamino)-3'-methylfluoran, 2'-chloro-6'-(diethylamino)fluoran and 6'-(diethylamino)-1',3'-dimethylfluoran, or crystal violet lactone or spiropyran leuco dyes could better achieve electric and temperature dual-control color change.

TABLE 1

Color change performance of electric and temperature dual-control color-changing dye microcapsules

| | Compound (1/8/50) | Driving Voltage | Voltage Applied or Not | Color Change Status |
|---|---|---|---|---|
| Example 1 | Fluoran dye + TBAP + diphenyl carbonate | 2.0 V | Yes | When the temperature was lower than 31° C., the sample was colorless; when the temperature was higher than 31° C., the sample became orange-red from colorless; when the temperature was lowered to 31° C. or below and then the voltage was removed, the sample still remained orange-red; and when the temperature was raised, the sample became colorless again |
| | | | No | The sample was colorless under any conditions |
| Example 2 | Fluoran dye + TBAP + phenyl salicylate | 3.6 V | Yes | When the temperature was lower than 25° C., the sample was colorless; when the temperature was higher than 25° C., the sample became orange-red from colorless; when the temperature was lowered to 25° C. or below and then the voltage was removed, the sample still remained orange-red; and when the temperature was raised, the sample became colorless again |
| | | | No | The sample was colorless under any conditions |
| Example 3 | Fluoran dye + TBAP + phenyl stearate | 5.7 V | Yes | When the temperature was lower than 31° C., the sample was colorless; when the temperature was higher than 31° C., the sample became orange-red from colorless; when the temperature was lowered to 31° C. or below and then the voltage was removed, the sample still remained orange-red; and when the temperature was raised, the sample became colorless again |
| | | | No | The sample was colorless under any conditions |
| Example 4 | Fluoran dye + TBAP + benzyl benzoate | 4 V | Yes | When the temperature was lower than 5° C., the sample was colorless; when the temperature was higher than 5° C., the sample became orange-red from colorless; when the temperature was lowered to 5° C. or below and then the voltage was removed, the sample still remained orange-red; and when the temperature was raised, the sample became colorless again |
| | | | No | The sample was colorless under any conditions |
| Example 5 | Fluoran dye + TBAP + glycerin monostearate | 2 V | Yes | When the temperature was lower than 80° C., the sample was colorless; when the temperature was higher than 80° C., the sample became orange-red from colorless; when the temperature was lowered to 80° C. or below and then the voltage was removed, the sample still remained orange-red; and when the temperature was raised to 80° C., the sample became colorless again |
| | | | No | The sample was colorless under any conditions |
| Example 6 | Fluoran dye + TBAP + cetyl alcohol + glycerin monostearate | 2 V | Yes | When the temperature was lower than 60° C., the sample was colorless; when the temperature was higher than 60° C., the sample became orange-red from colorless; when the temperature was lowered to 60° C. or below and then the voltage was removed, the sample still remained orange-red; and when the temperature was raised to 60° C., the sample became colorless again |
| | | | No | The sample was colorless under any conditions |
| Comparative Example 1 | Fluoran dye + diphenyl carbonate | Arbitrary | Yes/No | The sample was colorless under any conditions |

TABLE 1-continued

Color change performance of electric and temperature dual-control color-changing dye microcapsules

| | Compound (1/8/50) | Driving Voltage | Voltage Applied or Not | Color Change Status |
|---|---|---|---|---|
| Comparative Example 2 | Fluoran dye + TBAP + cetyl alcohol | 11 V | Yes | When the temperature was lower than 28° C., the sample was colorless; when the temperature was higher than 28° C., the sample became orange-red from colorless (the color change was uneven and the color was lighter); when the temperature was lowered to 28° C. or below and then the voltage was removed, the sample still remained orange-red; and when the temperature was raised, the sample became colorless again |
| | | | No | The sample was colorless under any conditions |
| Comparative Example 3 | Fluoran dye + TBAP + diphenyl carbonate | Arbitrary | Yes/No | The sample was colorless under any conditions |

The inventors have found after many experiments that when the selected organic solid material is one or more of macromolecular ethers and esters, including glyceryl monostearate, glycerin monostearate, phenyl salicylate, glyceryl laurate, p-azoxyanisole, diphenyl carbonate, phenyl salicylate, phenyl stearate and benzyl benzoate, the obtained microcapsule product can achieve electric and temperature dual-control color change and a driving voltage being lower than 10 V. When other types of organic solid materials (such as small molecular organic alkyl alcohols and alkyl acids, including stearyl alcohol, cetyl alcohol, myristyl alcohol, myristic acid, palmitic acid, stearic acid and the like) are used alone, electric and temperature dual-control color change cannot be achieved, or the driving voltage is too high, or the color development effect is not good. However, when the small molecular organic alkyl alcohols and alkyl acids, such as stearyl alcohol, cetyl alcohol, myristyl alcohol, myristic acid, palmitic acid, stearic acid and the like, are compounded with ethers and esters, such as glyceryl monostearate, glycerin monostearate, phenyl salicylate, glyceryl laurate, p-azoxyanisole, diphenyl carbonate, phenyl salicylate, phenyl stearate, benzyl benzoate and the like, the color change temperature can be significantly lowered.

The inventors have found after many experiments that when the ratio of the leuco dye to the electrolyte to the organic solid material is 1:(2-10):(15-50), the electric and temperature dual-control bi-stable color-changing microcapsules prepared from the selected electrolyte, leuco dye and ester organic solid material have good color change performance and a driving voltage of less than 10 V, which is lower than the human body safety voltage. After the microcapsules change color and then the power is cut off, the stable time can reach 5 days.

What is claimed is:

1. A method of preparing an electric and temperature dual-control bi-stable color changing microcapsules, comprising the step of:
   (1) preparing a dual-control compound: heating and stirring an electric and temperature dual-control bi-stable color-changing dye to form a dual-control compound in uniform mixed solution; wherein the electric and temperature dual-control bi-stable color-changing dye, comprising a leuco dye, an electrolyte and an organic solid material, wherein the leuco dye is 2'-chloro-6'-(diethylamino)fluoran; the electrolyte is tetrabutylammonium perchlorate; the organic solid material is selected from the group consisting of stearyl alcohol, cetyl alcohol, myristyl alcohol, myristic acid, palmitic acid, stearic acid, glyceryl monostearate, glycerin monostearate, glyceryl laurate, p-azoxyanisole, diphenyl carbonate, phenyl salicylate, phenyl stearate and benzyl benzoate; and a ratio of the leuco dye to the electrolyte to the organic solid material is 1:2-10:15-50; and
   (2) preparation of dual-control bi-stable microcapsules: dropwise adding the dual-control compound obtained in step (1) to an aqueous solution containing an emulsifier, the emulsifier accounting for 25-100% by mass of the dual-control compound, and carrying out high-speed emulsification to form a uniform dye dispersion; dropwise adding monomers accounting for 20-100% by mass of the dual-control compound to the dye dispersion, and continuing emulsification for 10-20 minutes; and then, transferring the emulsified dispersion into a four-neck flask with a reflux condenser and a stirring device, after introducing nitrogen for 5-30 minutes, raising a temperature to 55-75° C. at a stirring speed of 250-500 r/min, after reaching a reaction temperature, dropwise adding an initiator accounting for 0.1-1% of a total amount of the monomers, keeping the temperature to react for 2-6 hours, and after the completion of the reaction, washing a product with water and drying the product to obtain the dual-control bi-stable microcapsules.

2. The method according to claim 1, wherein the monomers are selected from the group consisting of methyl methacrylate, styrene, ethyl methacrylate, butyl methacrylate, vinyl acetate, methyl vinyl ether, acrylonitrile, acrylamide, isoprene and dicyclopentadiene.

3. The method according to claim 1, wherein the initiator is selected from the group consisting of potassium persulfate, ammonium persulfate and azobisisobutylamidine hydrochloride.

4. The method according to claim 1, wherein the emulsifier is selected from the group consisting of nonionic surfactants, anionic surfactants and polymeric surfactants.

5. The method according to claim 1, wherein the emulsifier is selected from the group consisting of gum arabic, sodium dodecylbenzenesulfonate, styrene-maleic anhydride copolymer, Tween and Span.

* * * * *